United States Patent [19]

Gillam et al.

[11] Patent Number: 5,425,352
[45] Date of Patent: Jun. 20, 1995

[54] PORTABLE GRILL

[75] Inventors: Ernie Gillam, Crestwood; Allan Lerch, Louisville, both of Ky.; Calvin Sprinkle, Borden, Ind.; Richard Bird, Louisville, Ky.

[73] Assignee: Porcelain Metals Corp., Louisville, Ky.

[21] Appl. No.: 286,420

[22] Filed: Aug. 9, 1994

[51] Int. Cl.⁶ .......................... A47J 37/07; F24B 3/00
[52] U.S. Cl. ..................................... 126/25 R; 99/450; 99/482; 126/9 R
[58] Field of Search ................. 99/447, 448, 449, 450, 99/482, 339, 340; 126/25 R, 25 A, 25 B, 9 R, 9 B, 26, 29, 30, 59.5

[56] References Cited

U.S. PATENT DOCUMENTS

| 103,736 | 5/1870 | Gregory | 126/25 R |
|---|---|---|---|
| D. 293,191 | 12/1987 | Stephen et al. | |
| 1,038,420 | 9/1912 | Newcomer et al. | 126/59.5 |
| 2,860,624 | 11/1958 | Eddy | |
| 2,910,930 | 11/1959 | Hankoff | |
| 3,046,769 | 7/1962 | Davis | |
| 3,327,698 | 6/1967 | Leslie | 126/25 R |
| 3,327,699 | 6/1967 | Uden | |
| 3,386,433 | 6/1968 | Copeland et al. | 99/450 |
| 3,765,397 | 10/1973 | Henderson | |
| 3,807,380 | 4/1974 | Pasin | |
| 3,851,639 | 12/1974 | Beddoe | |
| 4,337,751 | 7/1982 | Sampson et al. | |
| 4,481,408 | 11/1984 | Scheufler | 99/450 X |
| 4,498,452 | 2/1985 | Schlosser et al. | |
| 4,512,249 | 4/1985 | Mentzel | 99/482 |
| 4,554,864 | 11/1985 | Smith et al. | 99/340 |
| 4,576,140 | 3/1986 | Schlosser | |
| 4,587,947 | 5/1986 | Tomita | |
| 4,762,114 | 8/1988 | Blankemeyer | |
| 4,895,134 | 1/1990 | Fielding et al. | |
| 4,909,235 | 3/1990 | Boetcker | |
| 5,086,752 | 2/1992 | Hait | 126/9 R |
| 5,218,950 | 6/1993 | Hait | |

Primary Examiner—Timothy F. Simone
Attorney, Agent, or Firm—Middleton & Reutlinger; David W. Carrithers

[57] ABSTRACT

A portable and nestable grill having two generally conical shaped sections forming inverted conical housings removably joined together at the smaller ends forming a midsection or waist of reduced diameter. The upper conical shaped housing defines an upper grilling section for supporting a cooking grate near the upper end and a means for supporting charcoal or other solid fuel at the lower end of the upper housing forming the waist section. The lower conical shaped housing defines a charcoal starter/ash catcher base section. A plurality of apertures are sized, shaped, and positioned to provide sufficient draft to create a venturi effect at the position of the fuel support means to provide fast pre-ignition of the solid charcoal fuel and superior convective heat transfer for cooking. The upper housing may be detached from the lower housing and the lower housing inverted and nested within the larger upper housing for transporting and storage. A bale type handle is pivotably attached to the upper housing for ease of handling.

16 Claims, 4 Drawing Sheets

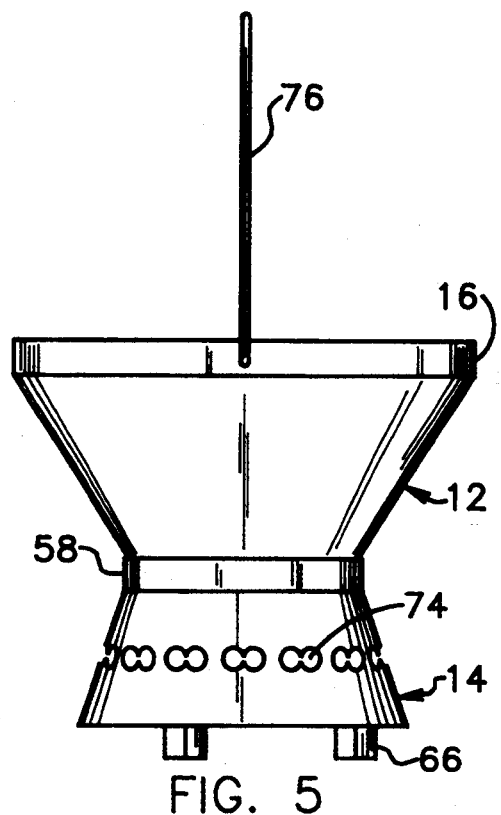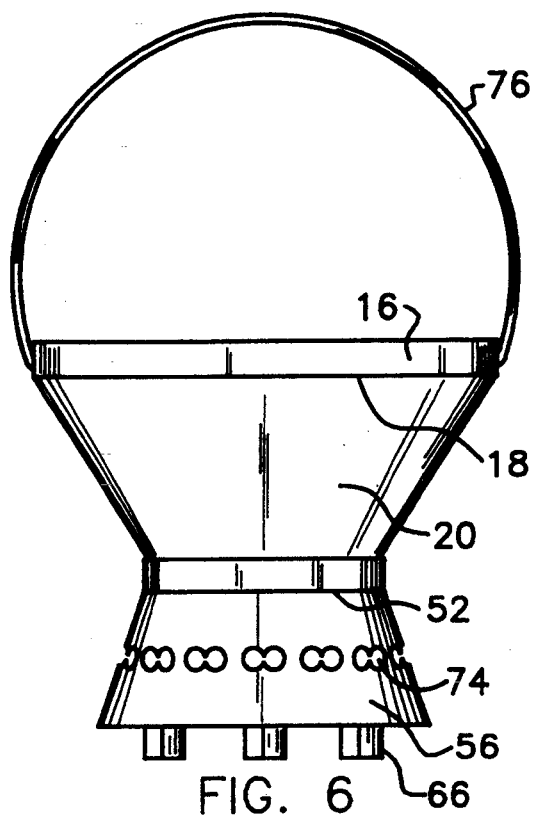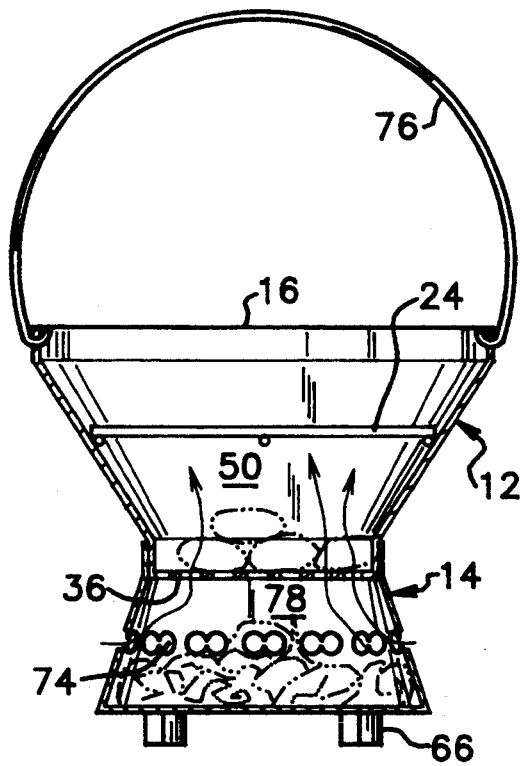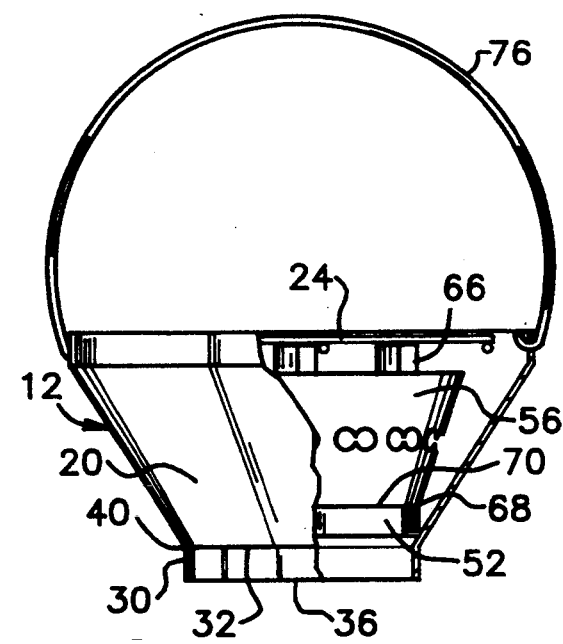

PORTABLE GRILL

BACKGROUND OF THE INVENTION

This invention relates to charcoal cooking grill and more particularly to a portable and nestable type grill having separate firebox and pre-ignition chambers.

Portable charcoal or other solid fuel burning stoves have been known for many years and are widely used for outdoor cooking. The prior art has provided a variety of portable stoves for outdoor cooking; however, conventional known in the art stoves are cumbersome and require petrochemical ignition agents for firing the charcoal. In accordance with the present Invention a portable grill is provided having the combined features of nestability for storage and transportation in a compact package. and an hourglass design providing a grilling section and combination charcoal starter/ash catcher base. The design of the draft openings and position of the solid fuel with respect to the shape of the housing provides quick ignition of the solid fuel and fast and even heating of the food articles.

SUMMARY OF THE INVENTION

A portable and nestable grill having two generally conical shaped sections forming inverted conical housings removably joined together at the smaller ends. The upper conical shaped housing defines an upper grilling section. The lower conical shaped housing defines a charcoal starter/ash catcher base section.

The large top open end of the upper housing includes a first cylindrical rim or lip extending therearound joining the upper edge of the conical shaped section. The small bottom open end of the upper housing includes a second cylindrical rim or lip extending therearound joining the lower edge of the conical shaped section. A means of supporting food articles such as a grate having apertures therein, or a grill formed of rods and stringers is supported within the upper housing at the intersection of the first rim and the tapered portion of the conical section. A means of supporting solid fuel material such as a grate having apertures therein, or a grill formed of rods and stringers is supported within the upper housing at the intersection of the second rim and the tapered portion of the conical section.

The small top open end of the lower housing includes a third cylindrical rim or lip extending therearound joining the upper edge of the conical shaped section. The large bottom end of the lower housing includes a floor surface joining the tapered walls forming an ash catcher. A plurality of support members form legs extending from the bottom of the lower housing floor form a base.

For ease of storage and transportation, the top grill may be removed and the bottom housing may be inverted and nested within the larger upper housing before replacing the top grill. A bale type handle is pivotably attached to the first rim for ease of handling.

The present invention provides a portable grill utilizing a combination of features to improve the performance of the grill, such as having separate firebox and pre-ignition chambers combined in a hourglass shaped housing. Strategically positioned draft openings create a venturi effect to increase the velocity of the air flowing over the solid charcoal fuel held in the reduced diameter waist section between the upper and lower housings to provide rapid ignition of charcoal or other suitable solid fuel without need for elaborate mechanical or petrochemical ignitors. The design of the present invention facilitates the use of coal, charcoal, wood or other solid fuel in the firebox chamber by using crumpled paper or other readily available kindling materials as a pre-ignition agent in the pre-ignition chambers, The second cylindrical rim of the upper housing engages and overlaps the third cylindrical rim of the lower housing joining the upper and lower housings forming a central cylindrical waist section or throat defining a venturi therebetween. A plurality of apertures are formed within the walls of the lower housing extending therearound, approximately midway between the fuel support means and the floor of the lower housing creating a plurality of draft openings of selected size and shape to optimize the flow of air currents therethrough. The combination of features forming the draft openings and the shaped of the upper and lower housings forming a venturi thereinbetween provide a fast ignition charcoal starter section.

The present invention may be further defined as a portable and nestable grill, comprising an upper grilling section comprising a generally conical shaped housing defining a first heating chamber, having an open top end and at least a partially open bottom end of reduced diameter. The housing includes an upper conical section and a first cylindrical top rim extending around the top of the upper conical section joining the upper edge of the upper conical section. A second cylindrical bottom rim extends around the bottom of the upper conical section joining the lower edge of the upper conical section. The upper grilling section includes a means of supporting food articles within the first rim. A lower charcoal starter/ash catcher base defines lower housing providing a second heat generation chamber. The lower housing comprises a generally conical shaped section having an open top end of reduced diameter and a closed bottom end. The housing further includes a lower conical section and a third cylindrical top rim extending around the top of the lower conical section joining the upper edge of the lower conical section. The lower housing further includes a floor panel joining the bottom edge of the lower conical section forming an ash catcher. The lower housing includes a plurality of apertures formed through the wall of the lower conical section creating draft openings of selected size, shape, area, and position serving to optimize the flow of air currents therethrough and providing an access means for lighting the pre-ignition materials. The lower housing is of smaller size than the upper housing permitting nesting of the lower housing inside of the upper housing during storage and transportation. The lower housing also includes a means for supporting the charcoal starter/ash catcher base section such as a plurlity of leg members. The second bottom rim of the upper housing is complementary sized and shaped for removably engaging the first top rim of the lower housing forming a reduced diameter central cylindrical waist section thereinbetween. The portable grill unit further includes a means of supporting solid fuel material such as charcoal within the reduced diameter central cylindrical waist section.

More particularly, the advantages and benefits of the present invention are achieved by the operative dispositions of two tapered wall inverted housings wherein the smaller ends of each housing are of like size and configuration for mating with one another to create a venturi effect within the portable grill to optimize heat transfer therein.

Accordingly, it is a principal object of the present invention to provide a charcoal starter doubling as an ash catcher.

It is another object of the present invention to provide a for an ash catcher having a solid surface suspended above the grill support surface to provide a safe guard against ashes falling on the ground and minimize fire hazards.

It is another object of the present invention to provide a plurality of apertures of draft vent openings extending around the periphery of the lower charcoal starter/ash catcher housing positioned, sized, and shaped to effect maximum draft at the reduced diameter waist charcoal fuel holding section.

It is another object of the present invention to provide a lower ash catcher housing having a lower portion comprising a floor joined to tapered side walls thereby providing a container for holding water used for extinguishing hot ambers remaining in the ashes after use.

It is yet another object of the present invention to provide a dome shaped cover for the grill as an option to cover the grilling surface during storage or transportation.

It is yet another object of the present invention to provide a fuel holding grate located near the waist of the grill to ignite the fuel more quickly and accelerate the ignition process.

Finally, it is another object of the present invention to provide a collapsible grill for storage and transport utilizing a single bale type hanger.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 5 is an elevational side view of FIG. 1 showing he pivotable bale handle;

FIG. 6 is an elevational front view of FIG. 1 showing the pivotable bale handle;

FIG. 7 is an cutaway front view of FIG. 1, showing the solid fuel in phantom lines suspended in the reduced diameter waist section of the grill, and showing a preignition starter fuel such as paper in phantom lines in the bottom of the charcoal starter/ash catcher base section below a plurality of draft openings extending uniformity spaced therearound;

FIG. 8 is a front cutaway view of the portable grill in the collapsed storage/transport position showing the lower section inverted and nested within the upper section;

SPECIFICATION

Figure 1:
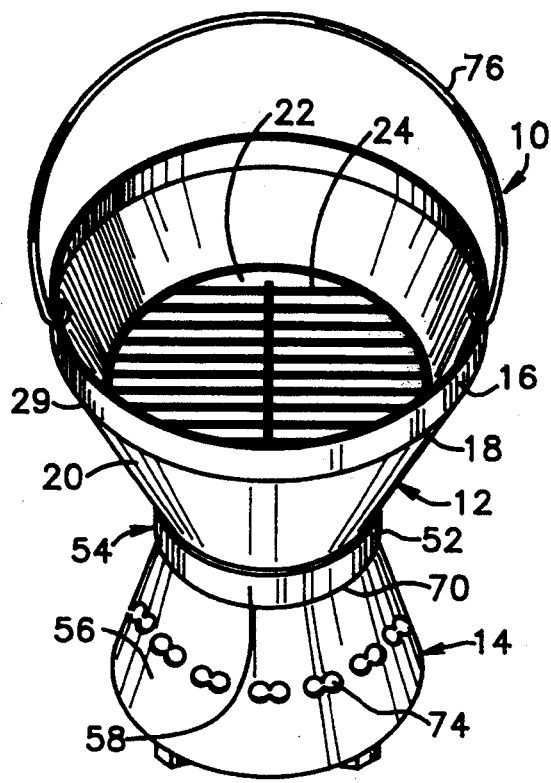
FIG. 1 is a perspective view of a portable grill made in accordance with the present invention showing the grill in the in-use erected position having an upper section supported by a lower section having a plurality of louvers therearound.
Figure 2:
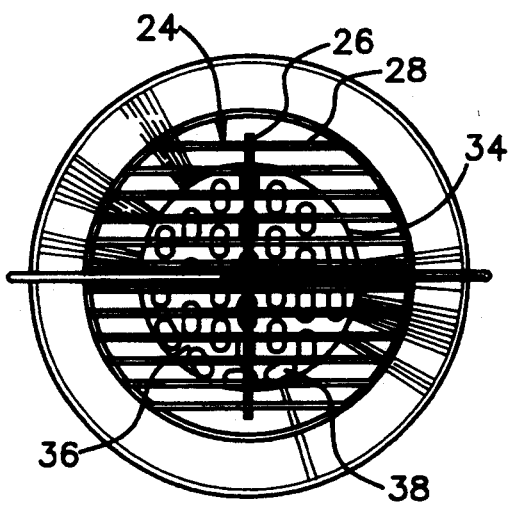
FIG. 2 is a plan top view of FIG. 1 showing the interior of the upper housing supporting fuel holding grate below a grill rack.
Figure 3:
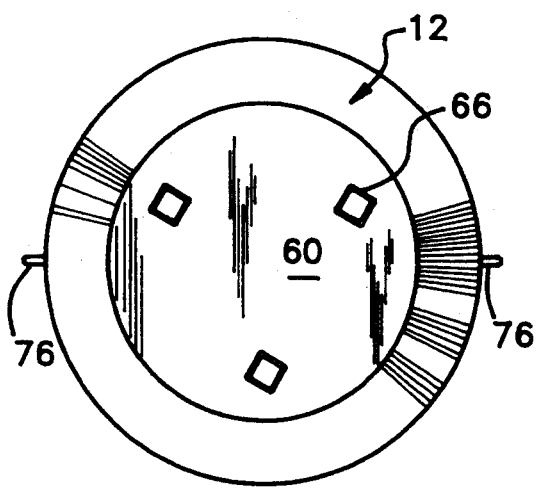
FIG. 3 is a plan bottom view of FIG. 1 showing a plurality of leg members extending downward from the solid bottom of the lower housing charcoal starter/ash catcher base.
Figure 4:
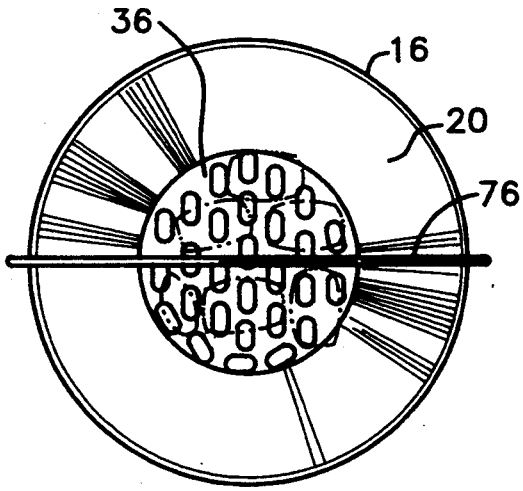
FIG. 4 is a top plan view of the present invention showing the bottom of the upper housing containing a grate or grid to support the solid fuel charcoal shown in phantom lines.
Figure 9:
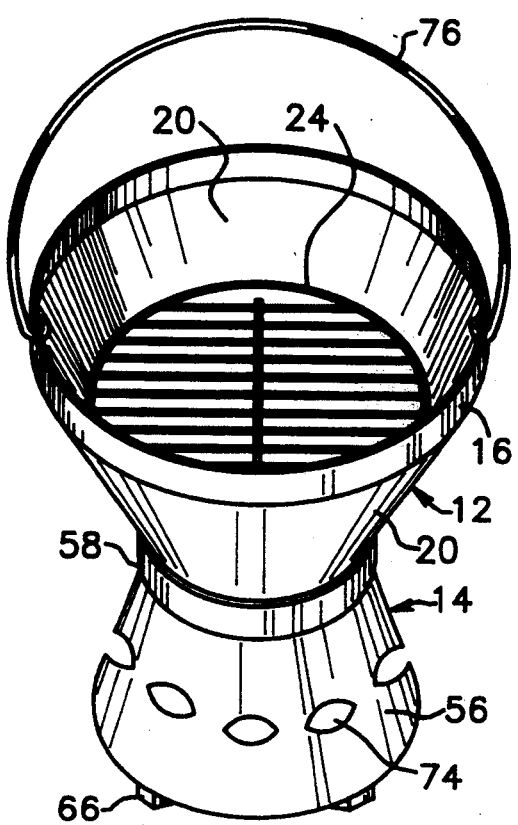
FIG. 9 is a perspective view of an alternate embodiment of FIG. 1 shown in the erected in-use position including a lower section having oval shaped louvers uniformly spaced therearound.

The portable grill of the present invention is manufactured from readily available materials and simple in design. The preferred embodiment is comprised of metal, more particularly porcelain coated steel; however, it is contemplated that copper, aluminum, stainless steel, or other metal alloys can be used with or without porcelain coating and in combination with or substituted for the porcelain coated metal components of the present invention.

With reference now to FIGS. 1-7 and 9-13, and 16-17, there is shown an operative embodiment or the present invention in the erected in-use position. A portable and nestable grill 10 comprising a pair of inverted generally conical shaped housings removably joined together at the smaller diameter ends forming an elongated hourglass shaped grill structure in the erected in-use position. The upper conical shaped housing defines an upper grilling section 12. The lower conical shaped housing defines a charcoal starter/ash catcher base section 14.

A first cylindrical top rim or lip 16 is joined to and extends upward vertically around the upper edge 18 of the upper conical shaped section 20 of the upper housing 12. The rim 16 may be welded to the conical section 20 or formed integrally therewith. The upper housing 12 includes a larger diameter peripheral opening 22 at the top of the first rim 16. A removable means of supporting food articles to be cooked such as a food supporting grate 23 having apertures 25 therethrough (not shown), or a food supporting grill 24 formed of rods 26 and stringers 28 is supported within the upper housing 12 at the intersection 29 of the first rim 16 and the upper edge 18 of the upper conical shaped section 20.

Figure 10:
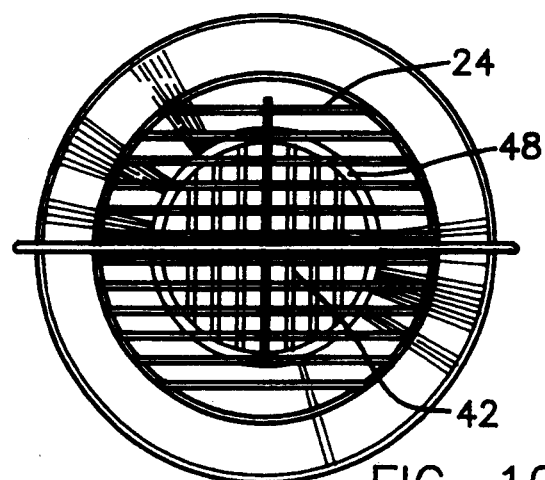
FIG. 10 is a plan top view of the present invention showing an alternate embodiment of a fuel holding support member.
Figure 11:
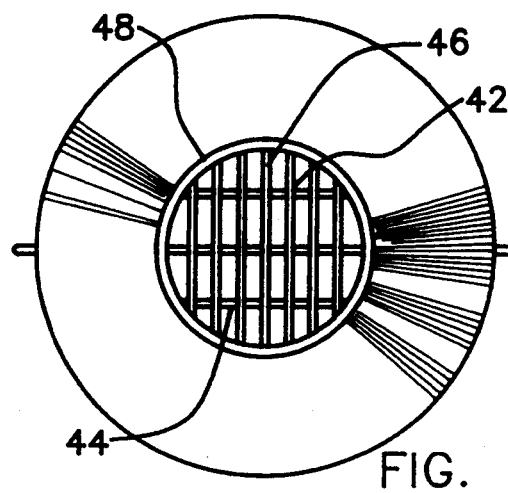
FIG. 11 is a plan bottom view showing an alternate fuel holding support member supported by a lip extending inwardly around the opening.
Figure 12:
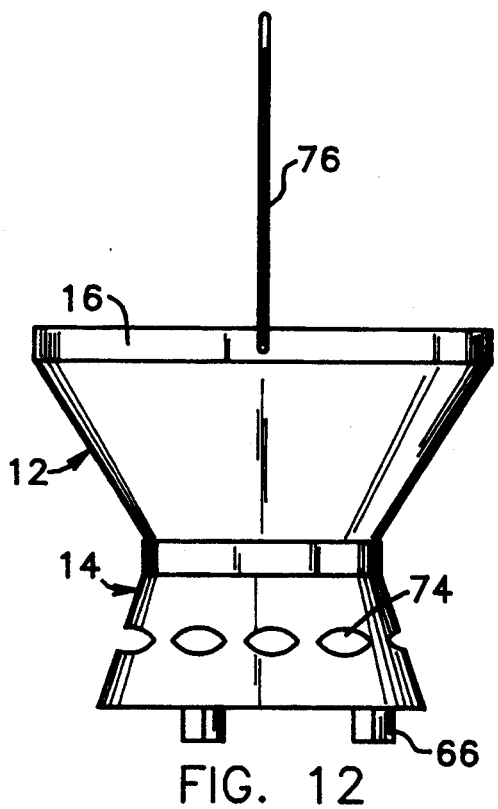
FIG. 12 is an elevational side view showing the portable grill embodiment of FIG. 9.
Figure 13:
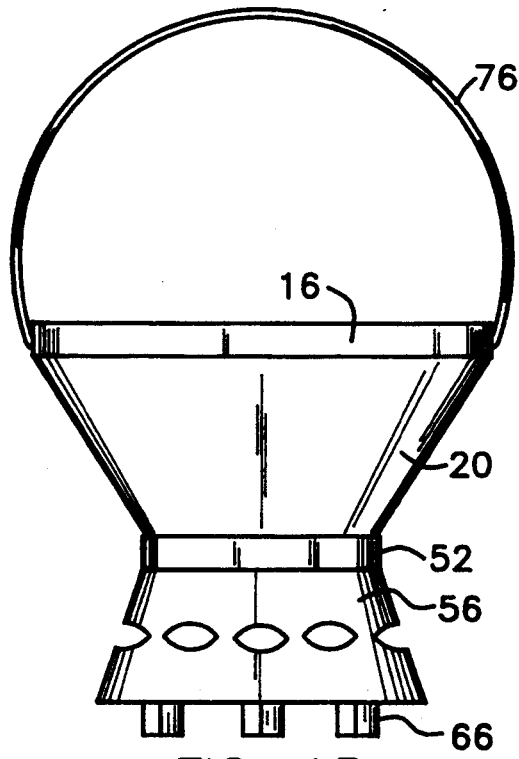
FIG. 13 is an elevational front view showing the portable grill embodiment of FIG. 9.

A second cylindrical bottom rim or lip 30 of reduced diameter is joined to and extends downward vertically around the lower edge 32 of the upper conical shaped section 20 of the upper housing 12. The rim 30 may be welded to the conical section 20 or formed integrally therewith. The upper housing 12 includes a smaller diameter peripheral opening 34 at the bottom of the second rim 30. As best shown in the preferred embodiment of FIG. 2, a means of supporting solid fuel material such as a fuel supporting circular grate 36 having a plurality of apertures 38 formed therein may be integrally formed or welded in the bottom of the upper conical shaped section 20 at the intersection 40 of the second rim 20 and the lower edge 32, or welded into any part of the reduced diameter portion forming the second rim 30. As shown in FIGS. 10 and 11, an alternate embodiment includes a means of supporting solid fuel material comprises a fuel supporting grill 42 formed of rods 44 and stringers 46 supported within the upper housing 12 at the intersection 40 of the second rim 30 and the lower edge 32 of the upper conical shaped section 20. Moreover the lower edge of the rim 30 may be bent or folded inwardly at an angle forming a circular support lip 48 extending inwardly to support a removable grate 36 or grill 42 sized to be retained therein. Charcoal or other suitable solid fuel can be placed onto the grate 36 or grill 42 which functions as a firebox or first upper heat generating chamber 50.

Figure 15:
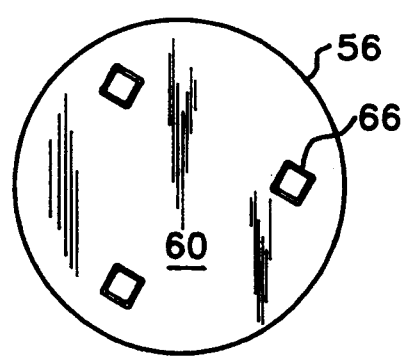
FIG. 15 is a plan bottom view of the charcoal starter/ash catcher.
Figure 14:
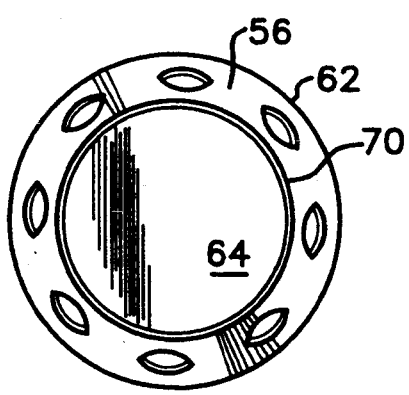
FIG. 14 is a plan top view of the charcoal starter/ash catcher.

The lower housing 14 includes a third cylindrical rim or lip 52 joining to and extending upward vertically around the upper edge 54 of the conical shaped section 56 of the lower housing 14 forming the charcoal starter/ash catcher base. The third rim 52 of the lower housing 14 defines a reduced diameter portion complementary sized in accordance with the reduced diameter bottom portion of the second rim 30 to overlap or underlap the second rim 30 joining the upper housing 12 and lower housing 14 together forming a support collar 54 thereinbetween at the midsection or waist 58 of the portable grill 10. A bottom end panel 60 joins the outer peripheral edge 62 of the conical section 56 of the lower housing 14 defining a floor 64 of the ash catcher 14 as shown in FIG. 14. As illustrated in FIG. 15, a plurality of support members or legs 66 are welded to or otherwise attached to the bottom of the bottom end panel 60 and extend downwardly forming a support base for the grill 10.

As an alternate embodiment, a means of supporting solid fuel material such as a circular grate 36 having a plurality of apertures 38 formed therein may be integrally formed or welded in at the top of the conical shaped section 56 at the intersection 68 of the third rim 52 and the upper edge 70 of the conical shaped section 56, or a grate 36 may be welded into any part of the reduced diameter portion of the lower housing 14 forming the third rim 52. Moreover, another alternate embodiment may include a means of supporting solid fuel material on a grill 42 formed of rods 44 and stringers 46 supported within the lower housing 14 at the intersection 68 of the third rim 52 and the upper edge 54 of the conical shaped section 56. Furthermore, the upper edge of the rim 52 may be bent or folded inwardly forming a circular support lip 72 extending inwardly to support the fuel supporting removable grate 36 or grill 42 sized to be retained therein. Charcoal or other suitable solid fuel can be placed onto the grate 36 or grill 42.

The lower housing comprising the charcoal starter/ash catcher 14 serves as a pre-ignition chamber in which a suitable pre-ignition agent such as, paper. cardboard, wood, or other kindling is placed to provide the requisite heat for ignition of the charcoal or other solid fuel supported on the grate 36 or grill 42 at the reduced diameter portion of the grill 10 forming the waist 58.

The second cylindrical rim 30 of the upper housing 12 removably engages and overlaps or underlaps (underlaps in the preferred embodiment) the third cylindrical rim 52 of the lower housing 14 joining the upper and lower housings, 12 and 14 respectively, forming the central cylindrical waist section 58 or throat defining a venturi therebetween increasing the velocity of the heated air flowing through the restricted orifice of throat 58. The internal heat supplied to the charcoal fuel and the food article to be cooked is intensified as the air drafts pass through throat 58 of the grill at a higher' velocity than conventional cylindrical grills and by the expansion of gases which magnify the convective heat transfer due to the swirl and high velocity of the air pattern passing therethrough and around the hot coals. The hot gases passing through the throat 58 and hot coals exit the restriction expanding and cooling, reducing the vapor velocity thereby creating a uniform heating of the food articles as the hot gases pass therethrough.

A plurality of apertures are formed within the lower conical shaped section 56 of the lower housing 14 extending therearound, approximately midway between the fuel support means 36 or 42, and the floor 64 of the lower housing 14 creating a plurality of draft openings 74 of selected size, shape, area, and position serve to optimize the flow of air currents therethrough and provide an access means for lighting the pre-ignition materials once the upper section 12 is coupled to the lower section 14. The design of the draft openings and upper and lower housings 12 and 14, respectively, forming a venturi thereinbetween provide for fast ignition of the charcoal using readily available ignition starter materials.

For ease of storage and transportation, the upper grilling housing 12 may be detached from the top of the lower charcoal starter/ash catcher housing 14 as shown best in FIG. 8. The lower housing is then inverted with the legs 66 projecting upward and is nested within the larger upper housing 12. The food supporting member or grill 24 is supported by the legs 66 of the lower housing 14. The embodiment of the upper grilling housing 14 utilizing an integral grate 36 or grill 42 integrally formed as a part thereof provides a flat bottom surface for supporting the nested portable grill 10 in the collapsed position, whereby the nested portable grill 10 resembles a bucket. The alternate embodiment utilizing a lip 48 within the rim 16 for supporting the fuel material provides a means for supporting the fuel support means 36, 42 of the grill 10 above the floor or ground surface, in that the fuel support means 36, 42 may be supported at the bottom of the upper conical section 20 adjacent the first rim 16 so that the rim 16 acts as a spacer to support the fuel support means above the ground in the nested position.

A bale type handle 76 is pivotably attached to the first rim for ease of handling. The location of the handle 76 near the cooking surface allow for transport of the grill 10 with one hand and storage from a single hangar.

The portable grill 10 provides a combination of features including separate firebox upper heat generating chamber 50 and lower charcoal starter pre-ignition second heat generating chamber 78 contained in a hourglass shaped grill 10 with strategically positioned draft openings 74 to create a venturi effect to increase the velocity of the air flowing over the solid charcoal fuel held in the reduced diameter waist section 58 providing rapid ignition of charcoal or other suitable solid fuel without need for elaborate mechanical or petrochemical ignitors. The combination of features of the present invention facilitates the use of coal, charcoal, wood or other solid fuel in the firebox chamber 50 by using crumpled paper or other readily available kindling materials as a pre-ignition agent in the pre-ignition charcoal starter chamber 78.

An advantage of the design of the portable grill 10 is that use of a charcoal starter doubling as an ash catcher 14 by simply providing a solid floor in the bottom of the pre-ignition chamber 78. The solid surface provides a safe guard against ashes falling on the ground and minimize fire hazards. Moreover, the design of the lower ash catcher housing 14 provides a container for holding water for extinguishing hot ambers remaining in the ashes after use.

Figure 16:
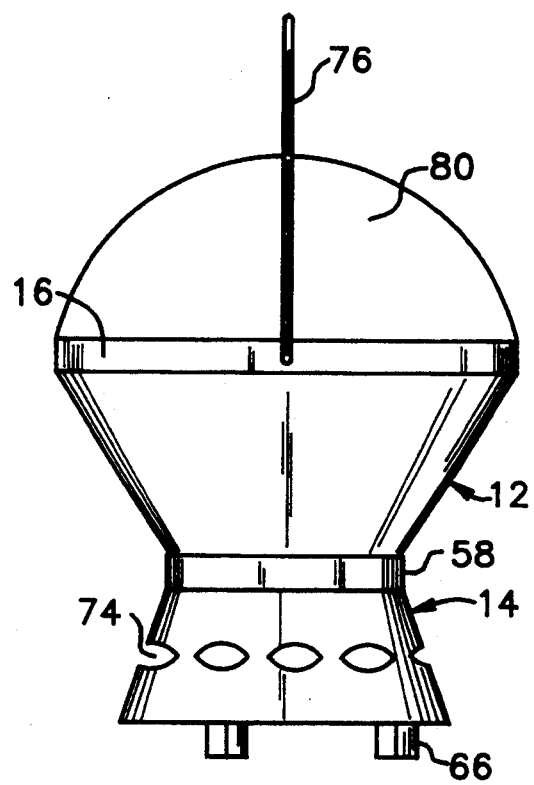
FIG. 16 is an elevational side view showing the portable grill embodiment of FIG. 9 including a dome shaped cover.
Figure 17:
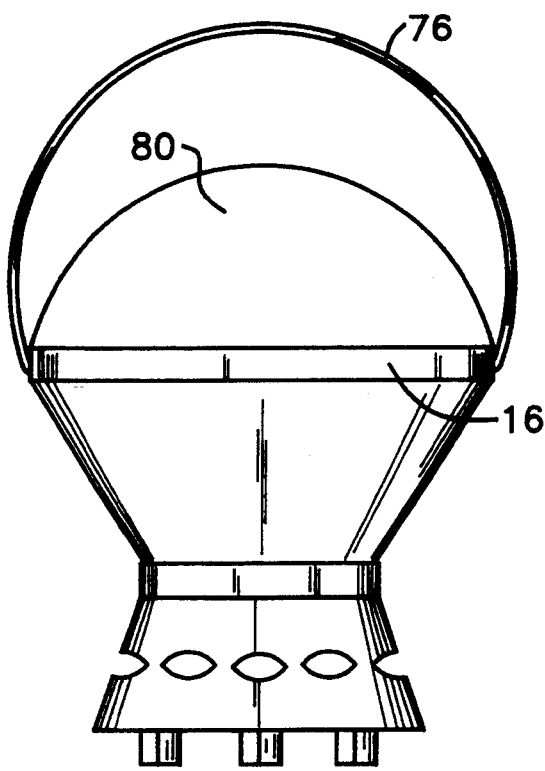
FIG. 17 is an elevational front view showing the portable grill embodiment of FIG. 9 including a dome shaped cover.

Furthermore, as shown in FIGS. 16 and 17 provide a dome shaped cover 80 for the grill 10 as an option to cover the grilling surface during storage or transportation. The cover 80 may have a lip 82 (not shown) of reduced diameter sized to fit contiguously with the inner surface of the first rim 16 extending downwardly into a portion of the rim 16.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. A portable and nestable grill, comprising:
   an upper grilling section comprising a generally conical shaped upper housing defining a first heating chamber, said upper housing having an open top end and at least a partially open bottom end of reduced diameter, said upper housing including an upper conical section and a first cylindrical top rim extending around the top of said upper conical section joining the upper edge of said upper conical section and a second cylindrical bottom rim extending around the bottom of said upper conical section joining the lower edge of said upper conical section;
   means of supporting food articles within said first rim;
   a lower charcoal starter/ash catcher base defining a lower housing forming a second heat generation chamber, said lower housing comprising a lower conical section having an open top end of reduced diameter and a closed bottom end, said lower housing having a third cylindrical top rim extending around the top of said lower conical section joining the upper edge of said lower conical section, said lower housing including a floor panel joining the bottom edge of said lower conical section forming an ash catcher, said lower housing including a plurality of apertures formed through the wall of said lower conical section creating draft openings of selected size, shape, area, and position serving to optimize the flow of air currents therethrough and providing an access means for lighting the pre-ignition materials, said lower housing being smaller in size than said upper housing, said lower housing being inverted and nested inside of said upper housing during storage and transportation;
   means for supporting said base section;
   said second bottom rim of said upper housing being complementary sized and shaped for removably engaging said first top rim of said lower housing forming a reduced diameter central cylindrical waist section therebetween; and
   means of supporting solid fuel material within said reduced diameter central cylindrical waist section.

2. The portable and nestable grill of claim 1, wherein said means of supporting food articles includes a grate having a plurality of apertures therein.

3. The portable and nestable grill of claim 1, wherein said means of supporting food articles includes a grill comprising a plurality of rods and stringers.

4. The portable and nestable grill of claim 1, wherein said means of supporting food articles is supported within said upper housing at the intersection of said first rim and said conical section.

5. The portable and nestable grill of claim 1, wherein said means for supporting said lower housing charcoal starter/ash catcher base section comprises a plurality of leg members attached to the bottom of said floor panel.

6. The portable and nestable grill of claim 1, including a bale type handle attached to said first rim of said upper housing.

7. The portable and nestable grill of claim 1, wherein said means of supporting solid fuel material within said reduced diameter central cylindrical waist section comprises a slotted grate integrally formed in said bottom of said upper housing.

8. The portable and nestable grill of claim 1, wherein said means of supporting solid fuel material within said reduced diameter central cylindrical waist section comprises a slotted removable grate integrally formed in said top of said lower housing.

9. The portable and nestable grill of claim 1, wherein said means of supporting solid fuel material within said reduced diameter central cylindrical waist section comprises a lip formed around the bottom edge of said upper housing, said lip extending inwardly forming a support for holding a removable grate having a plurality of apertures therein.

10. The portable and nestable grill of claim 1, wherein said means of supporting solid fuel material within said reduced diameter central cylindrical waist section comprises a lip formed around the bottom edge of said upper housing, said lip extending inwardly forming a support for holding a removable grill comprising a plurality of rods and stringers.

11. The portable and nestable grill of claim 1, including a cover removably attachable to the upper grilling section.

12. The portable and nestable grill of claim 1, wherein said cover removably attachable to the upper grilling section is a dome.

13. The portable and nestable grill of claim 1, wherein said material of construction for said grill is selected from the following group consisting of steel, copper, stainless steel, aluminum, and porcelain coated steel.

14. The portable and nestable grill of claim 1, wherein said plurality of apertures formed through the wall of said lower conical section creating draft openings of selected size, shape, area, and position are elliptical in shape.

15. The portable and nestable grill of claim 1, wherein said lower housing doubles as a charcoal starter and an ash catcher.

16. The portable and nestable grill of claim 1, wherein said plurality of apertures formed through the wall of said lower conical section creating draft openings of selected size, shape, area, are positioned as low as possible to enhance the air flow and venturi effect of the reduced diameter central waist section and provide a means for retaining the ashes.

* * * * *